(12) United States Patent
Czapiewska et al.

(10) Patent No.: US 10,391,993 B2
(45) Date of Patent: Aug. 27, 2019

(54) COMPRESSED AIR-SUPPLY-SYSTEM FOR A PNEUMATIC SYSTEM, HOUSING FOR THE COMPRESSED AIR-SUPPLY-SYSTEM, METHOD FOR MANUFACTURING A HOUSING, METHOD FOR OPERATING A COMPRESSED AIR SUPPLY, CONTROL-UNIT AND VEHICLE

(71) Applicant: WABCO Europe BVBA, Brussels (BE)

(72) Inventors: Kamila Czapiewska, Wroclaw (PL); Radoslaw Czapiewski, Wroclaw (PL); Heinrich Diekmeyer, Barsinghausen (DE); Adam Zawisza, Wroclaw (PL)

(73) Assignee: WABCO Europe BVBA, Brussels (BE)

( * ) Notice: Subject to any disclaimer, the term of this patent is extended or adjusted under 35 U.S.C. 154(b) by 23 days.

(21) Appl. No.: 15/544,441

(22) PCT Filed: Dec. 23, 2015

(86) PCT No.: PCT/EP2015/002608
§ 371 (c)(1),
(2) Date: Jul. 18, 2017

(87) PCT Pub. No.: WO2016/116122
PCT Pub. Date: Jul. 28, 2016

(65) Prior Publication Data
US 2017/0361822 A1 Dec. 21, 2017

(30) Foreign Application Priority Data
Jan. 21, 2015 (EP) ..................... 15000164

(51) Int. Cl.
*B60T 13/68* (2006.01)
*B60T 17/00* (2006.01)
*F15B 21/048* (2019.01)
*F15B 21/041* (2019.01)
*B60T 8/32* (2006.01)
(Continued)

(52) U.S. Cl.
CPC ............ *B60T 13/683* (2013.01); *B60T 8/327* (2013.01); *B60T 13/662* (2013.01);
(Continued)

(58) Field of Classification Search
CPC ...... B60T 13/68; B60T 13/662; B60T 13/683; B60T 17/02; B60T 8/327
(Continued)

(56) References Cited

U.S. PATENT DOCUMENTS 4,892,569 A * 1/1990 Kojima ................ B01D 53/261
96/113
5,209,764 A * 5/1993 Eberling ............ B01D 53/0415
96/114
(Continued)

FOREIGN PATENT DOCUMENTS

| DE | 102004021242 A1 | 11/2005 |
|---|---|---|
| DE | 19861222 B4 | 8/2008 |
| EP | 2532561 A1 | 12/2012 |

OTHER PUBLICATIONS

International Search Report for PCT/EP2015/002608 dated Mar. 12, 2016, 3 pages.
(Continued)

*Primary Examiner* — Christopher P Schwartz
(74) *Attorney, Agent, or Firm* — Warner Norcross & Judd LLP (57) ABSTRACT

A compressed air supply system for supplying compressed air to a pneumatic system is disclosed. The compressed air supply system comprises a compressed air input port, a compressed air output port and a vent port, a pneumatic main pipe arranged between the compressed air input port and the compressed air output port, a pneumatic vent pipe arranged between the compressed air output port and the vent port and connected to the pneumatic main pipe, a purge
(Continued)

valve arranged in the pneumatic vent pipe for venting the compressed air supply system, a regeneration valve for controlling a regeneration flow of compressed air through an air dryer arranged in the main pipe, a governor valve for generating a pressure signal, and a first and a second pneumatic control pipe.

19 Claims, 4 Drawing Sheets

(51) Int. Cl.
*B60T 13/66* (2006.01)
*B60T 17/02* (2006.01)

(52) U.S. Cl.
CPC ............ *B60T 17/004* (2013.01); *B60T 17/02* (2013.01); *F15B 21/041* (2013.01); *F15B 21/048* (2013.01); *F15B 2211/8855* (2013.01)

(58) Field of Classification Search
USPC ........................................ 303/3, 15, 20, 127
See application file for complete search history.

(56) References Cited

U.S. PATENT DOCUMENTS

| | | | | |
|---|---|---|---|---|
| 5,458,676 | A * | 10/1995 | Herbst | B01D 53/261 96/109 |
| 6,785,980 | B1 * | 9/2004 | Koelzer | B60T 17/004 34/218 |
| 2009/0199522 | A1 * | 8/2009 | Hilberer | B60T 17/004 55/385.1 |
| 2010/0269926 | A1 * | 10/2010 | Hilberer | B60T 15/48 137/511 |
| 2012/0285327 | A1 * | 11/2012 | Schal | B60T 17/02 96/113 |
| 2013/0062541 | A1 * | 3/2013 | Diekmeyer | B60T 13/683 251/12 |
| 2013/0304329 | A1 * | 11/2013 | Feyerabend | B60T 13/268 701/48 |
| 2014/0060667 | A1 * | 3/2014 | Leinung | B60T 13/662 137/351 |
| 2014/0144326 | A1 * | 5/2014 | Minato | B01D 53/0407 96/108 |

OTHER PUBLICATIONS

English language abstract and machine translation for DE19861222 (B4) extracted from http://worldwide.espacenet.com database on Aug. 29, 2017, 8 pages.

English language abstract and machine translation for DE102004021242 (A1) extracted from http://worldwide.espacenet.com database on Aug. 29, 2017, 8 pages.

* cited by examiner

Fig. 3A

COMPRESSED AIR-SUPPLY-SYSTEM FOR A PNEUMATIC SYSTEM, HOUSING FOR THE COMPRESSED AIR-SUPPLY-SYSTEM, METHOD FOR MANUFACTURING A HOUSING, METHOD FOR OPERATING A COMPRESSED AIR SUPPLY, CONTROL-UNIT AND VEHICLE

CROSS-REFERENCE TO RELATED APPLICATIONS

This application is the National Stage of International Application No. PCT/EP2015/002608, filed on 23 Dec. 2015, which claims priority to and all advantages of European Patent Application No. 15000164.2, filed on 21 Jan. 2015, the content of which is hereby incorporated by reference.

FIELD OF THE INVENTION

The present invention generally relates to a compressed air supply system and, more specifically, to a compressed air supply system for supplying compressed air to a pneumatic system of a commercial vehicle, a housing for the compressed air supply system, a method for manufacturing the housing for the compressed air-supply-system, a method for operating the compressed air supply system, a control unit for controlling the compressed air-supply-system, and a vehicle comprising the control unit.

BACKGROUND OF THE INVENTION

Compressed air supply systems are used in many vehicles of all kinds, in particular for supplying compressed air to an air brake system of a vehicle. To ensure a long-term operation, the air supply system comprises an air dryer by which the compressed air is dried and cleaned, in order to prevent an accumulation of moisture in the pneumatic system, which can lead to damaging or unwanted defects in the compressed air supply system or in the pneumatic system. Therefore, the air dryer comprises a desiccant, typically a bed of granules, through which the compressed air flows so that the bed of granules absorb moisture contained in the air. Furthermore, the compressed air supply system typically comprises a number of ports, valves and other components, in order to control and operate the compressed air supply of a given pneumatic system, e.g. a brake system of a certain vehicle.

However, different vehicles use different compressed air supply systems. Conventionally, different vehicles comprise different air supply and/or pneumatic systems, wherein each of these systems comprises different components on their part, in particular valves and/or connections ports, etc. Each system is optimized to necessary requirements for a given vehicle and application. In view of these various systems there is a need to provide an improved solution, in particular one compressed air supply system, which is capable to be implemented in these various numbers of pneumatic systems and/or vehicles.

SUMMARY OF THE INVENTION

The present invention provides an improved pneumatic system, in particular a compressed air-supply-system, for supplying compressed air to more than one system. A housing for the compressed air supply system is also provided, and the compressed air supply system may be universally utilized. Also a method for manufacturing the housing and a method for operating the compressed air supply system are provided, wherein the costs for manufacturing and utilization are reduced.

The compressed air supply system for supplying compressed air to a pneumatic system, in particular an air supply system of a commercial vehicle, comprises: a compressed air input port, a compressed air output port and a vent port, a pneumatic main pipe arranged between the compressed air input port and the compressed air output port, a pneumatic vent pipe arranged between the compressed air output port and the vent port and connected to the pneumatic main pipe, a purge valve arranged in the pneumatic vent pipe for venting the compressed air supply system, the purge valve comprising a first and a second purge valve port and a control port, a regeneration valve for controlling a regeneration flow of compressed air through an air dryer arranged in the main pipe, the regeneration valve comprising at least a first and a second regeneration valve port, a governor valve for generating a pressure signal, the governor valve comprising at least a first and a second governor valve port, and a first and a second pneumatic control pipe, wherein the first pneumatic control pipe connects the second regeneration valve port of the regeneration valve to the control port of the purge valve and the second pneumatic control pipe connects the second governor valve port of governor valve with the control port of the purge valve, wherein either the first or the second pneumatic control pipe is open.

The housing for the compressed air supply system comprises a first pneumatic control pipe for connecting a regeneration valve to a control port of a purge valve, and a second pneumatic control pipe for connecting a governor valve to the control port of the purge valve, wherein either the first or the second pneumatic control pipe is open.

A method for manufacturing the housing for a compressed air supply system comprises providing a housing for the compressed air supply system with a first and a second pneumatic control pipe, wherein the first pneumatic control pipe connects a regeneration valve and a control port of a purge valve, and the second pneumatic control pipe connects a governor valve and the control port of the purge valve, wherein the first and the second pneumatic control pipe are closed. The method further comprises opening one of the first or second pneumatic control pipe.

A method for operating the compressed air supply system comprises venting a compressed air supply system by switching a purge valve from a first switching state to a second switching state by a pressure signal generated either by a regeneration valve or by a governor valve, wherein in the first switching state the purge valve is closed between a first and a second purge valve port, and in the second switching state the purge valve is open between the first and the second purge valve port.

A control-unit for controlling the compressed air-supply-system is also provided.

A vehicle, in particular a commercial motor vehicle, comprising the control unit is also provided, wherein the control-unit is configured to control the compressed air-supply-system.

The compressed air supply system and other aspects of the present invention may be implemented to at least two different vehicles or pneumatic systems, namely to one system on the one hand using a first pneumatic control pipe of the compressed air supply system and on the other hand to another system using a second pneumatic control pipe, wherein in the one system the first and in the other system the second pneumatic control pipe is used to guide a pressure signal to a control port of a purge valve for controlling the purge valve, e.g. for switching the purge valve from a first switching state to a second switching state, wherein in the first switching state the purge valve is closed between a first and a second purge valve port, and in the second switching state the purge valve is open between the first and the second purge valve port.

Typically, either the first or the second pneumatic control pipe is open while the corresponding other pneumatic control pipe is permanently closed during operation of the system.

As used herein, the term "pipe" also means and encompasses pipelines, conduits, tubes, duct, channel, flow passage, etc.

When the compressed air supply system is utilized with two pneumatic systems, in one system the first pneumatic control pipe is connected between the second regeneration valve port of the regeneration valve and the control port of the purge valve. In the other system the second pneumatic control pipe connects the second governor valve port of governor valve with the control port of the purge valve. Generally in such embodiments, if the first pneumatic control pipe is used, then the second pneumatic control pipe is not used, and vice versa. In other words, in embodiments of the compressed air supply system, the first pneumatic control is open and the second pneumatic control pipe is closed on the one hand and if the second pneumatic control is open then the first pneumatic control pipe is closed on the other hand.

The present invention also provides a housing, wherein both alternatives—as outlined above—may be implemented. However, after preparation of the housing, at the beginning both control pipes, namely the first and the second pneumatic control pipe, may be closed. When the housing is used for a certain system, one of the two pneumatic control pipes, namely either the first or the second pneumatic control pipe, may be opened, e.g. by drilling a hole.

The present invention comprises a number of advantages, including a low manufacturing cost, a simple and robust design, a small and compact size and a reduced weight.

In certain embodiments, the purge valve comprises a first and a second switching state, wherein in the first switching state the purge valve is closed between the first and the second purge valve port and in the second switching state the purge valve is open between the first and the second purge valve port. By switching the purge valve from the first to the second switching state the flow through the purge valve is switched on or off.

In specific embodiments, the regeneration valve is a 3/2-way solenoid valve comprising third regeneration valve port connected to the atmosphere, and wherein the regeneration valve further comprises a first and a second switching state, wherein in the first switching state the regeneration valve is open between the second and the third regeneration valve port, and in the second switching state the regeneration valve is open between the first and the second regeneration valve port. Solenoid valves, as used herein, include electromechanically operated valves, wherein the valve is controlled by an electric current through a solenoid. In this particular embodiment the regeneration valve is a three-port valve comprising an additional third regeneration valve port connected to the atmosphere.

In certain embodiments, the governor valve is a 3/2-way solenoid valve comprising a third governor valve port connected to the atmosphere and wherein the governor valve further comprises a first and a second switching state, wherein in the first switching state the governor valve is open between the second and the third governor valve port, and in the second switching state the governor valve is open between the first and the second governor valve port. In this particular embodiment the governor valve is a three-port valve comprising an additional third governor valve port connected to the atmosphere. The governor valve can be switched between the two outlet ports, namely a first and a second switching state, wherein in the first switching state the governor valve is open between the second and the third governor valve port, and in the second switching state the governor valve is open between the first and the second governor valve port.

In specific embodiments of the compressed air supply system, the first regeneration valve port and the first governor valve port are connected by a pneumatic valve pipe and the pneumatic valve pipe is further connected to the pneumatic main pipe.

In these or other embodiments, the second regeneration valve port of the regeneration valve and the air dryer in the main pipe are connected by a pneumatic regeneration pipe.

In various embodiments a check valve, in particular a non-return valve, and a throttle are arranged in the pneumatic regeneration pipe. A check valve, which may also be referred to as a clack valve, a non-return valve or a one-way valve, is a valve that allows gas (or compressed air) to flow through it in only one direction. Check valves are two-port valves, having two ports or openings in a body, one for gas to enter and the other for gas to leave.

In a specific embodiment the throttle in the pneumatic regeneration pipe is built with a diameter between 1 mm and 2 mm. According to this embodiment, the flow of gas, in particular the flow of dried and cleaned compressed air, through the pneumatic regeneration pipe can be limited and/or managed and/or controlled by the throttle. The gas flow is correlated to the diameter of the throttle. The throttle may be controllable; in particular a diameter of the throttle may be controllable.

In one embodiment a further check valve, in particular a non-return valve, is arranged in the pneumatic main pipe. According to this embodiment the further check valve prevents a backflow of the compressed air in a portion of the pneumatic main pipe and in the pneumatic system when the compressor is switched off.

In specific embodiments of the compressed air supply system, the second governor valve port is further connected to a further control port for supplying the pressure signal generated by the governor valve to a further control device. According to this embodiment the generated pressure signal may be used to switch the compressor off or on.

In a further embodiment the control device is configured to switch the compressor off or on, based on the pressure signal generated by the governor valve.

For a more complete understanding of the invention, the invention will now be described in detail with reference to the accompanying drawing. The detailed description will illustrate and describe what is considered as a specific embodiment of the invention. It should of course be understood that various modifications and changes in form or detail could readily be made without departing from the spirit of the invention. It is therefore intended that the invention is not be limited to the specific form and detail shown and described herein The wording "a" or "an" does not exclude a plurality.

BRIEF DESCRIPTION OF THE DRAWING

The invention is described in greater detail below with reference to the accompanying figures, in which.

DETAILED DESCRIPTION

Figure 1:
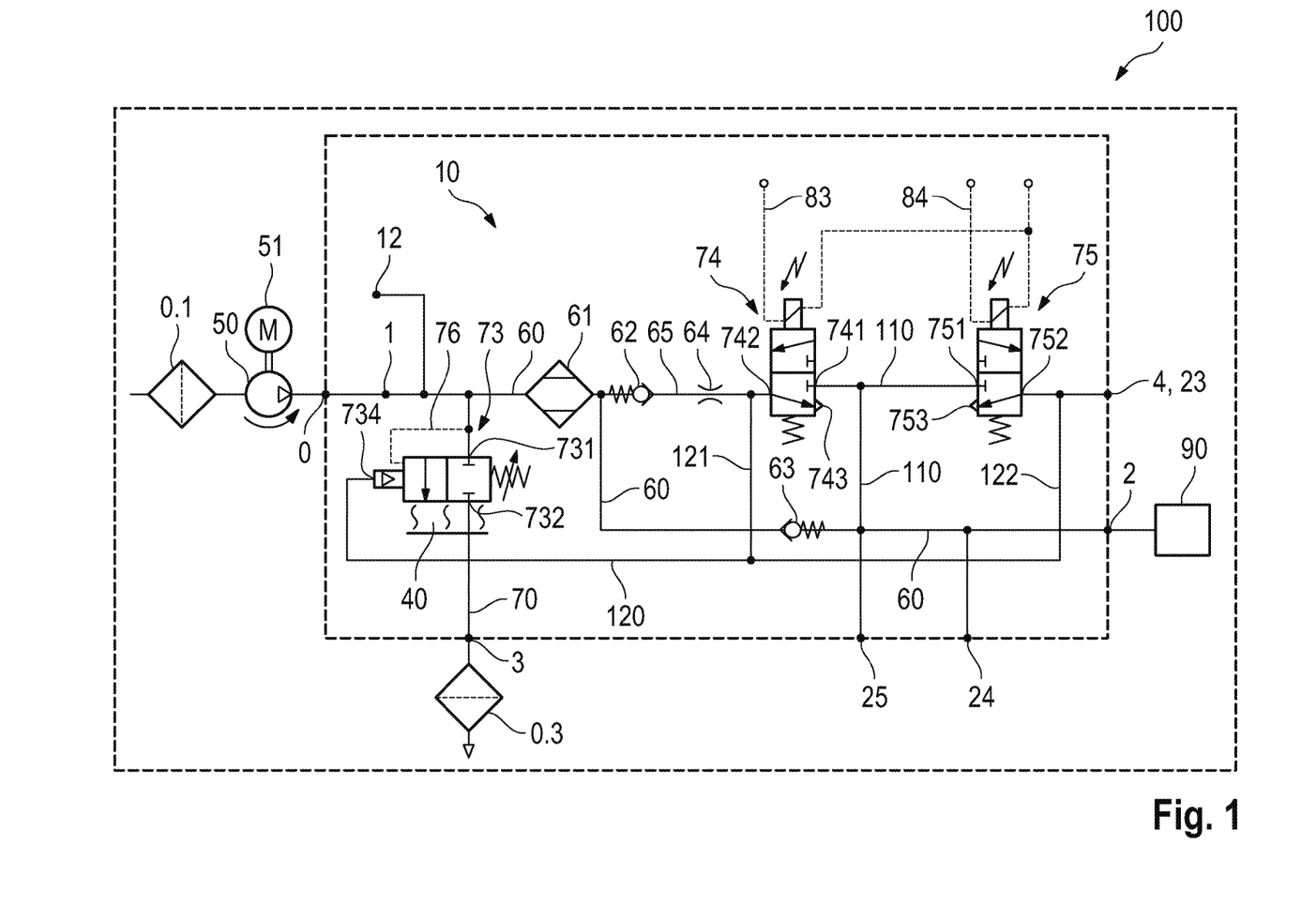
FIG. 1 shows a schematic view of one embodiment of a compressed air-supply-system.

With reference to the specific embodiment of the Figures, wherein like numerals generally indicate like parts throughout the several views, FIG. 1 shows a schematic view of one embodiment of a compressed air-supply-system 10. The shown compressed air supply system 10 is connected to a pneumatic system 90, in particular an air brake system, via a compressed air output port 2. Furthermore, a vehicle 100 comprising an air supply system 10 and a pneumatic system 90 is schematically indicated.

The shown compressed air supply system 10 comprises an air supply port 0 for providing air to the compressed air supply system 10. The air supply port 0 is connected to a compressed air input port 1 via a pneumatic pipe comprising a compressor 50 and a motor 51 for driving the compressor 50.

A first pneumatic connection is a pneumatic main pipe 60 arranged between the compressed air input port 1 and the compressed air output port 2. In the pneumatic main pipe 60 an air dryer 61 is arranged to provide cleaned and dried compressed air to the pneumatic system 90.

Furthermore, the air supply system 10 comprises a controllable purge valve 73. The purge valve 73 is arranged in a pneumatic vent pipe 70 connected to the pneumatic main pipe 60 and arranged between the compressed air output port 2 and the vent port 3. The purge valve 73 comprises a first and a second purge valve port 731, 732 and a control port 734. The purge valve 73 is preferably built as a 2/2 way valve comprising two switching states, namely a first and a second switching state, wherein in the first switching state the purge valve 73 is closed between the first and the second purge valve port 731, 732, and in the second switching state the purge valve 73 is open between the first and the second purge valve port 731, 732. The purge valve 73 further comprises an electrical heater 40 which prevents from freezing of the purge valve 73.

The purge valve 73 further comprises a relief safety valve 76 to protect the pneumatic system 90 against unforeseen malfunction between the compressor 50 and the air dryer 61.

Additionally the air supply system 10 comprises a regeneration valve 74 for controlling a regeneration flow of compressed air through the air dryer 61 arranged in the main pipe 60. The air supply system 10 further comprises a governor valve 75 for generating a pressure signal.

The regeneration valve 74 comprises at least a first and a second regeneration valve port 741, 742, wherein the regeneration valve 74 is preferably built as a 3/2 way solenoid valve comprising a third governor valve port 743 connected to the atmosphere. The regeneration valve 74 comprises a first and second switching state. In the first switching state the regeneration valve 74 is open between the second and the third regeneration valve port 742, 743, and in the second switching state the regeneration valve 74 is open between the first and the second regeneration valve port 741, 742.

Solenoid valves—in the sense of the present application—are electromechanically operated valves. The regeneration valve 74 is controlled by an electronic signal or electric current through a solenoid of the regeneration valve 74 applied via the electronic connections 83. The regeneration valve 74 is switched on or off by the electronic signal or electric current.

The governor valve 75 comprises at least a first and a second governor valve port 751, 752, wherein the governor valve 75 may be built as a 3/2 way solenoid valve comprising a third governor valve port 753 connected to the atmosphere. The governor valve 75 further comprises a first and a second switching state, wherein in the first switching state the governor valve is open between the second and the third governor valve port 752, 753, and in the second switching state the governor valve 75 is open between the first and the second governor valve port 751, 752. The governor valve 75 is controlled, in particular switched on or off, by an electronic signal or electric current applied to the solenoid by the electronic connections 84.

However, for venting the compressed air supply system 10 the purge valve 73 is switched from the first to the second switching state, by providing compressed air (pressure signal) to the control port 734 of the purge valve 73. Therefore, the control port 734 of the purge valve 73 is pneumatically connected—via a control relay pipe 120—to the first or to the second pneumatic control pipe 121, 122, wherein the first pneumatic control pipe 121 connects the second regeneration valve port 742 of the regeneration valve 74 to the control port 734 of the purge valve 73 and the second pneumatic control pipe 122 connects the second governor valve port 752 of the governor valve 75 with the control port 734 of the purge valve 73. However, only one of the first or second pneumatic control pipe 121, 122 is open for providing the compressed air (pressure signal) to the control port 734 of the purge valve 73.

Figure 2:
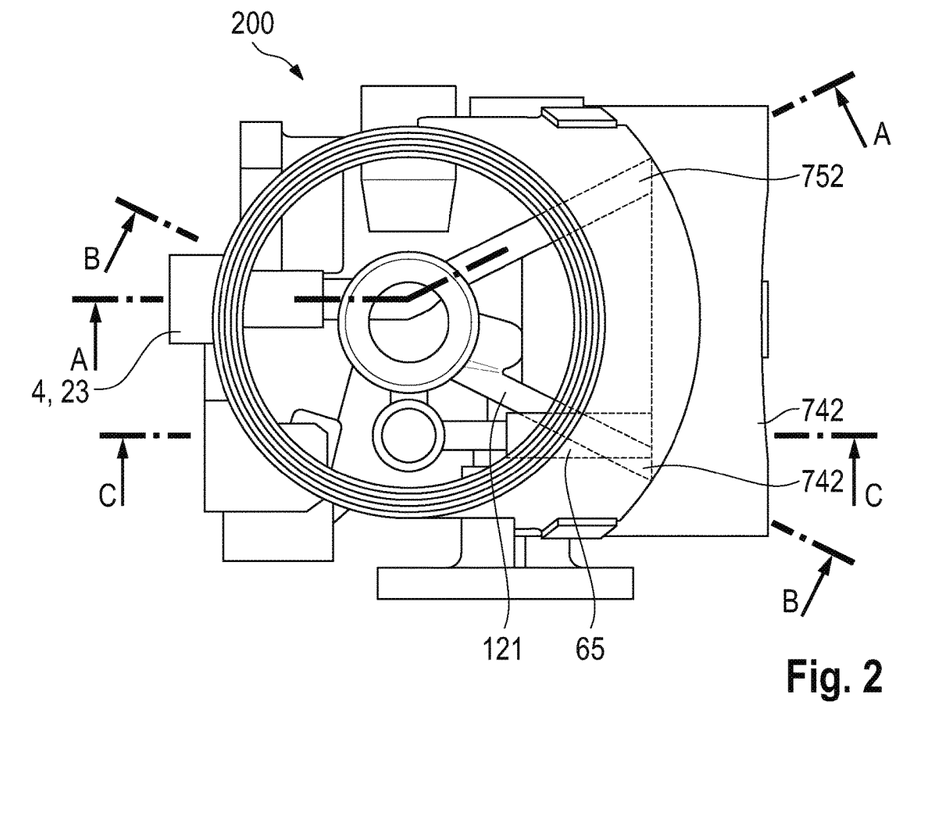
FIG. 2 shows a schematic view of an embodiment of a housing for a compressed air-supply-system.

FIG. 2 shows a schematic view of an embodiment of a housing 200 for a compressed air-supply-system as described in FIG. 1. The shown housing 200 is for a system using the first pneumatic control pipe 121 for providing/guiding a pressure signal to the control port 734 of the purge valve 73 (not shown).

The housing 200 depicted in FIG. 2 is shown form above. The FIGS. 2A, 2B and 2C show corresponding cross sections through the housing along the lines A, B and C.

Figure 2A:
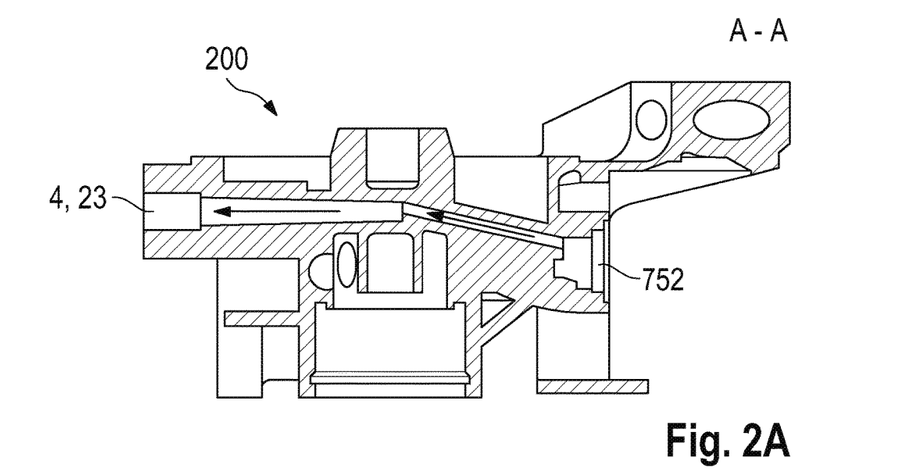
FIGS. 2A, 2B, 2C shows corresponding cross sections of the embodiment of the housing for the compressed air-supply-system as depicted in FIG. 2.

FIG. 2A shows the cross section along the line A, in particular the connection pipe between the second governor valve port 752 of the governor valve 75 (not shown) and a further control port 4, 23 for supplying a pressure signal generated by the governor valve to a further control device (not shown).

Figure 2B:
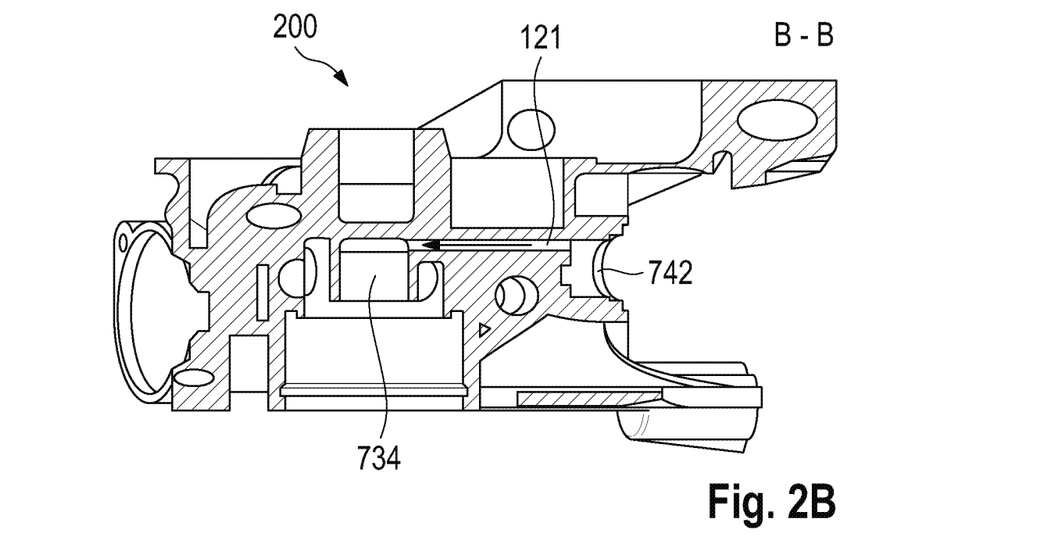

FIG. 2B shows the cross section along the line B, in particular the connection pipe 121 between the second regeneration valve port 742 of the regeneration valve 74 (not shown) and the control port 734 of the purge valve 73 (not shown).

Figure 2C:
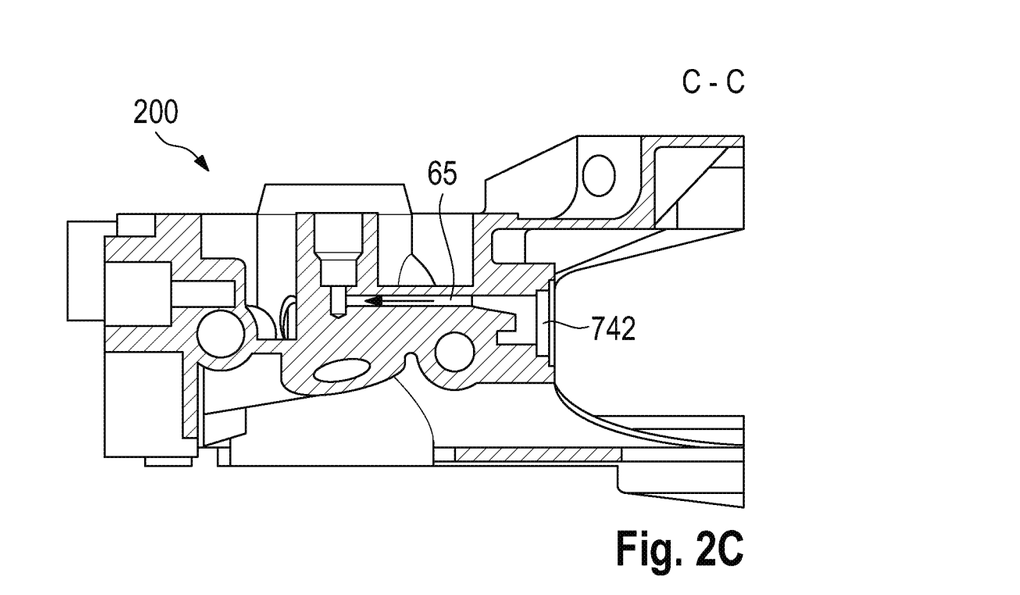

FIG. 2C shows the cross section along the line C through the housing 200. The cross section C shows the pneumatic regeneration pipe 65 between the second regeneration valve port 742 of the regeneration valve 74 (not shown) and the air dryer 61 (not shown). In certain embodiments a check valve and a throttle (not shown) are arranged in the pneumatic regeneration pipe 65.

Figure 3:
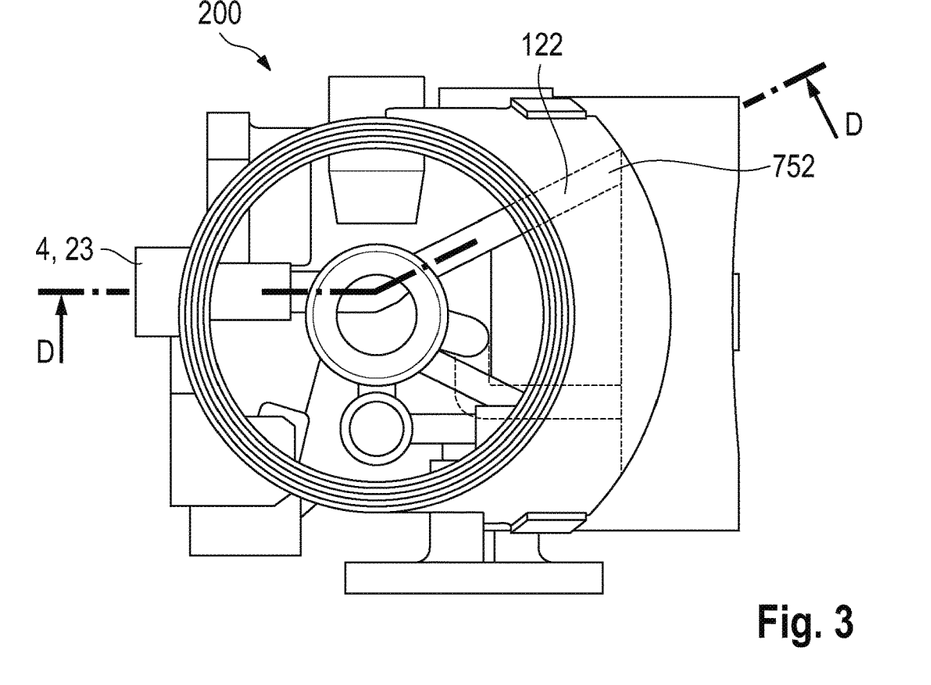
FIG. 3 shows a schematic view of another embodiment of a housing for a compressed air-supply-system.

FIG. 3 shows an embodiment of a housing 200 for a compressed air-supply-system as described in FIG. 1, wherein the shown housing 200 uses the second pneumatic control pipe 122 for providing/guiding the pressure signal form the second governor valve port 752 to the control port 734 of the purge valve 73 (not shown).

Figure 3A:
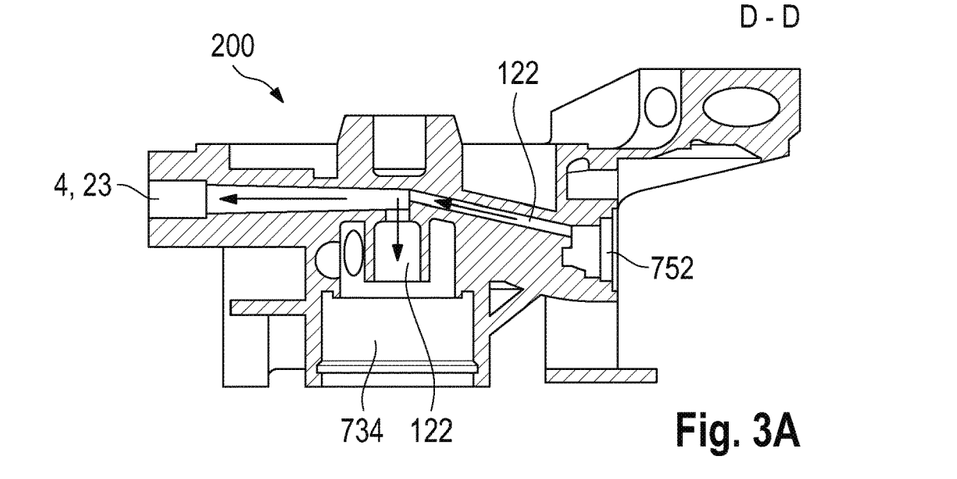
FIG. 3A shows the corresponding cross section of the embodiment of FIG. 3.

FIG. 3A shows the cross section along the line D through the housing 200. The cross section along D shows the second pneumatic control pipe 122 between the second governor valve port 752 of the governor valve 75 (not shown) and the control port 734 of the purge valve 73 (not shown) as well as to a further control port 4, 23 for supplying a pressure signal generated by the governor valve to a further control device (not shown).

REFERENCE LIST 0.1 Air filter
0.3 Further air filter
0 Compressed air supply port
1 Compressed air input port
12 Additional compressed air input port
2 Main compressed air output port
3 Vent port
4 Further control port
10 Compressed air supply system
23 Further control port
24 Second compressed air output port
25 Third compressed air output port
40 Heater
50 Compressor
51 Motor
60 Pneumatic main pipe
61 Air dryer
62 Check valve
63 Check valve
64 Throttle
65 Pneumatic regeneration pipe
70 Pneumatic vent pipe
73 Purge valve
731 First purge valve port
732 Second purge valve port
734 Control port
74 Regeneration valve
741 First regeneration valve port
742 Second regeneration valve port
743 Third regeneration valve port
75 Governor valve
76 Relief safety valve in the purge valve 73
751 First governor valve port
752 Second governor valve port
753 Third governor valve port
83 Electronic connections of the regeneration valve 74
84 Electronic connections of the governor valve 75
90 Pneumatic system
100 Vehicle
110 Pneumatic valve pipe
120 Control relay pipe
121 First pneumatic control pipe
122 Second pneumatic control pipe
200 Housing

What is claimed is:

1. A compressed air supply system for supplying compressed air to an air supply system of a commercial vehicle, said compressed air supply system comprising:
   a compressed air input port, a compressed air output port and a vent port,
   a pneumatic main pipe arranged between the compressed air input port and the compressed air output port,
   a pneumatic vent pipe connected to the pneumatic main pipe between the compressed air output port and the vent port,
   a purge valve arranged in the pneumatic vent pipe for venting the compressed air supply system, said purge valve comprising a first and a second purge valve port and a control port,
   a regeneration valve for controlling a regeneration flow of compressed air through an air dryer arranged in the main pipe, said regeneration valve comprising at least a first and a second regeneration valve port, the first regeneration valve port being connected to the pneumatic main pipe, the second regeneration valve port being connected to the purge valve control port,
   a governor valve for generating a pressure signal, said governor valve comprising at least a first and a second governor valve port, the first governor valve port being connected to the pneumatic main pipe, the second governor valve port being connected to the purge valve control port, and
   a first and a second pneumatic control pipe, wherein the first pneumatic control pipe connects the second regeneration valve port of the regeneration valve to the control port of the purge valve and wherein the second pneumatic control pipe connects the second governor valve port of the governor valve with the control port of the purge valve, wherein either the first or the second pneumatic control pipe is open by selectively connecting the pneumatic main pipe to the purge valve control port through the regeneration valve or the governor valve for actuating the purge valve.

2. The compressed air supply system according to claim 1, wherein the second regeneration valve port of the regeneration valve and the air dryer in the main pipe are connected by a pneumatic regeneration pipe.

3. The compressed air supply system according to claim 2, wherein a check valve and a throttle are arranged in the pneumatic regeneration pipe.

4. The compressed air supply system according to claim 3, wherein the throttle in the pneumatic regeneration pipe has a diameter between 1 and 2 mm.

5. The compressed air supply system according to claim 2, wherein the check valve is a non-return valve.

6. The compressed air supply system according to claim 1, wherein a further check valve is arranged in the pneumatic main pipe.

7. The compressed air supply system according to claim 6, wherein the further check valve is a non-return valve.

8. A control unit for controlling a compressed air supply system according to claim 1.

9. A vehicle comprising the control unit according to claim 8.

10. The compressed air supply system according to claim 1, wherein the second governor valve port is further connected to a control port for supplying the pressure signal generated by the governor valve to a control device.

11. The compressed air supply system according to claim 10, wherein the control device is configured to switch the compressor off or on, based on the pressure signal generated by the governor valve.

12. The compressed air supply system according to claim 1, wherein the purge valve is a 2/2-way valve comprising a first and a second switching state, wherein in the first switching state the purge valve is closed between the first and the second purge valve port, and wherein in the second switching state the purge valve is open between the first and the second purge valve port.

13. The compressed air supply system according to claim 1, wherein the regeneration valve is a 3/2-way solenoid valve comprising a third regeneration valve port connected to the atmosphere and wherein the regeneration valve further comprises a first and a second switching state, wherein in the first switching state the regeneration valve is open between the second and the third regeneration valve port, and wherein in the second switching state the regeneration valve is open between the first and the second regeneration valve port.

14. A method for manufacturing a housing for the compressed air supply system according to claim 1 said method comprising:
   providing a housing for the compressed air supply system with a first and a second pneumatic control pipe, wherein the first pneumatic control pipe connects a regeneration valve and a control port of a purge valve, and the second pneumatic control pipe connects a governor valve and the control port of the purge valve, wherein the first and the second pneumatic control pipe are closed, and
   opening one of the first or second pneumatic control pipes.

15. A method for operating the compressed air supply system according to claim 1, said method comprising:
   venting a compressed air supply system by switching a purge valve from a first switching state to a second switching state by a pressure signal generated either by a regeneration valve or by a governor valve, wherein in the first switching state the purge valve is closed between a first and a second purge valve port, and wherein in the second switching state the purge valve is open between the first and the second purge valve port.

16. The compressed air supply system according to claim 1, wherein the governor valve is a 3/2-way solenoid valve comprising a third governor valve port -connected to the atmosphere and wherein the governor valve further comprises a first and a second switching state, wherein in the first switching state the governor valve is open between the second and the third governor valve port, and wherein in the second switching state the governor valve is open between the first and the second governor valve port.

17. The compressed air supply system according to claim 1, wherein the first regeneration valve port and the first governor valve port are connected by a pneumatic valve pipe and the pneumatic valve pipe is further connected to the pneumatic main pipe.

18. A housing for a compressed air supply system, said housing comprising:
   a pneumatic main pipe connected between a compressed air input port and a compressed air output port,
   a purge valve connected to the pneumatic main pipe,
   a first pneumatic control pipe for connecting a regeneration valve to a control port of the purge valve, the regeneration valve including a regeneration valve input port connected to the pneumatic main pipe and a regeneration valve output port connected to the purge valve control port, and
   a second pneumatic control pipe for connecting a governor valve to the control port of the purge valve, the governor valve including a governor valve input port connected to the pneumatic main pipe and a governor valve output port connected to the purge valve control port,
   wherein either the first or the second pneumatic control pipe is open by selectively connecting the pneumatic main pipe to the purge valve control port through the regeneration valve or the governor valve for actuating the purge valve.

19. The housing according to claim 18, wherein the housing is configured to provide a compressed air supply system according to claim 1.

* * * * *